G. K. BAINBRIDGE.
CANDY CUTTING MACHINE.
APPLICATION FILED JAN. 9, 1919.

1,303,151.

Patented May 6, 1919.

INVENTOR
G. K. Bainbridge
BY
ATTORNEY

UNITED STATES PATENT OFFICE.

GEORGE K. BAINBRIDGE, OF RIPON, CALIFORNIA.

CANDY-CUTTING MACHINE.

1,303,151.  Specification of Letters Patent.  Patented May 6, 1919.

Application filed January 9, 1919. Serial No. 270,392.

*To all whom it may concern:*

Be it known that I, GEORGE K. BAINBRIDGE, a citizen of the United States of America, residing at Ripon, in the county of San Joaquin, State of California, have invented certain new and useful Improvements in Candy-Cutting Machines; and I do declare the following to be a clear, full, and exact description of the same, reference being had to the accompanying drawings, and to the characters of reference marked thereon, which form a part of this application.

This invention relates to improvements in candy cutting machines and particularly to the improvements on certain portions of the machine shown in Letters Patent No. 1,192,156, granted me July 25th, 1916, and to which reference is made hereinafter.

The principal object of the present invention is to provide a means for positively insuring that the plastic candy material, when it issues from the press, will be cut off cleanly and in such a manner that each piece so cut may be relied on to drop in exactly the same relative position on the conveyer belt below to the one preceding it. This latter result is attained by the addition of a braking device secured to the shaft of the cutting mechanism.

This cutting mechanism, in order to secure positive results, is necessarily operated by a gear or chain drive, but no matter how closely the gears mesh or how tight the chain may be drawn, there is always a certain amount of backlash or play, and this play is brought into evidence when the strain incident to the cutting of the candy material is suddenly relieved upon the termination of the cutting process.

This relieving of the strain, therefore, throws the cutting member up to a greater or lesser degree, depending on the exact position of the intermeshing gear or chain sprocket teeth at that moment, and the amount of backlash therebetween. This action tends to cause a lump of candy material, which, on account of its sticky nature, is inclined to adhere to the cutting member, to be deposited on the conveyer belt beneath a greater or lesser distance from the preceding lump, depending on the amount of "jump" of the freed cutting member. This malspacing of the candy lumps is something I have striven to avoid, as it is apt to clog up the subsequent processes, and I have successfully prevented this from occurring by the braking means heretofore referred to.

As a further object, I have produced a simple device and yet one which is exceedingly efficient for the purpose for which it is designed.

These objects, I accomplish by means of such structure and relative arrangement of the parts as will fully appear by a perusal of the following specification and claims.

On the drawings, similar characters of reference indicate corresponding parts in the several views.

Figure 1:
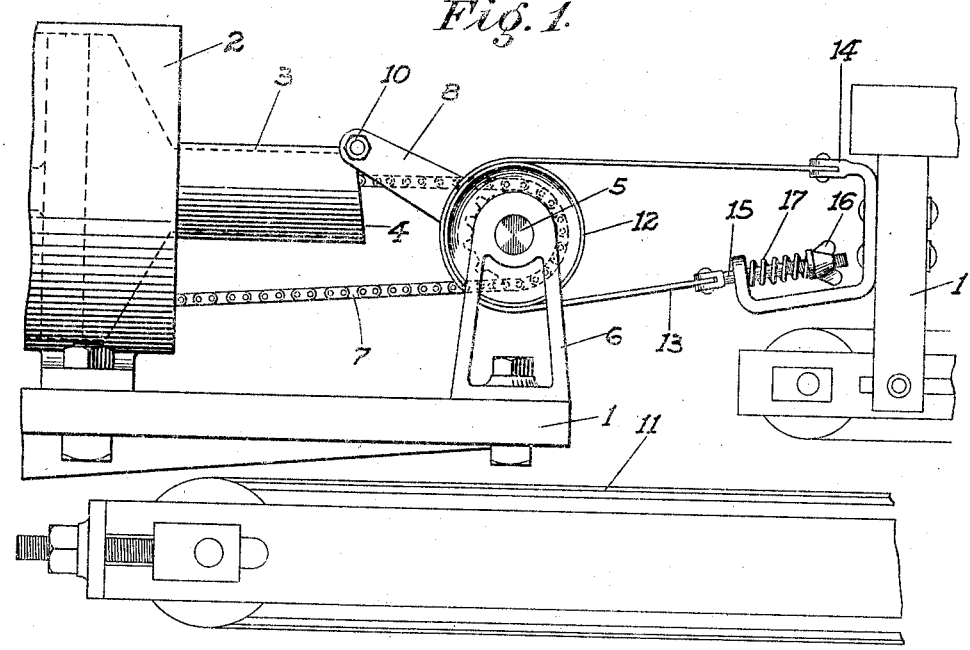
Figure 1 is a fragmentary side elevation of my candy cutting machine, showing my improved features in connection therewith.

Referring now more particularly to the figures of reference on the drawings, the numeral 1 indicates the frame of the machine to which is secured the candy press 2, having a tubular outlet 3 projecting therefrom.

The operation of the press 2 being the same as that shown in the Letters Patent referred to, I do not show or describe it more fully in this application.

The outer end of the outlet 3 is cut on a slight slant, as shown at 4, with the lower edge projecting the farthest from the press.

Positioned a certain distance from the outlet 3 and at right angles thereto is a shaft 5, mounted to the frame 1 by bearings 6, and driven by a train of gears or a chain drive 7 from any desired source of power. Secured to the shaft 5 are arms 8, one on either side of the outlet 3, between which arms is stretched a cutting wire 9, adjustable as to tautness by means of take-up nuts 10.

Figure 2:
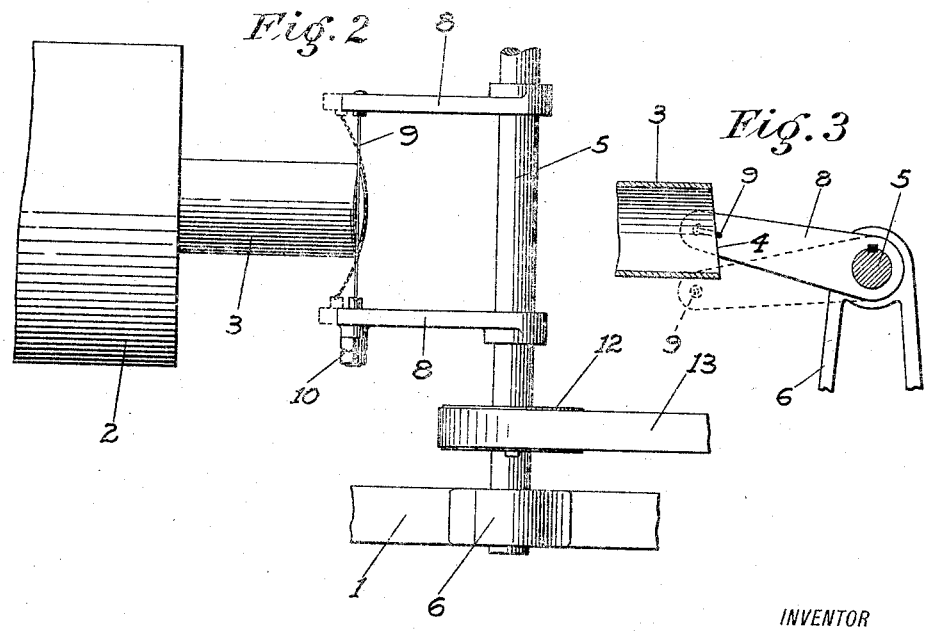
Fig. 2 is a top plan view of the cutting mechanism.
Figure 3:
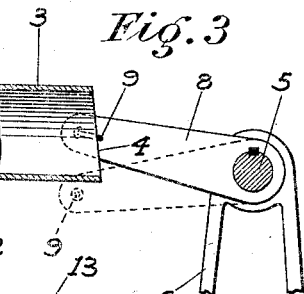
Fig. 3 is a sectional view of the cutting member and the press spout or outlet tube.

This wire is positioned in the arms 8 so that with the rotation of the shaft 5 in a counter clock-wise direction, it will just clear the upper edge of the outlet 3, the center of the shaft 5 being about on a level with the bottom of the outlet. The tightness of the wire is then regulated to suit, the pressure of the candy material being forced out of the tube 3 being sufficient to spring the wire past the slanting edges of the tube 3, as shown in dotted lines on Fig. 2. The wire passing below the tube is immediately freed from this pressure, and snaps back to a straight line, thus effectually cutting off the candy material and causing the same to drop on the conveyer belt 11 suitably positioned below the outlet 3.

As before mentioned, however, this release of pressure causes the backlash of the gears or chain to be brought into play, tending to cause each piece of candy material to drop on the belt a different distance from the one preceding it. To obviate this tendency, I have mounted a drum 12 on the shaft 5, having a flexible brake strap 13 passing around the same, one end of the strap being secured to a bracket 14 secured to a projection of the frame 1, and the other end being secured to a bolt 15 slidable through the bracket 14. On the bolt is an adjustment nut 16, between which nut and bracket is a spring 17 so that the band 13 is held against the drum 12 by the tension of the spring, this tension being regulated by the nut 16. The braking friction thus had, while not sufficient to heat the drum 12, or retard the proper turning of the shaft 5, effectually prevents the blacklash of the driving means of said shaft from coming into play, and acts as a shock absorber when the cutting pressure on the wire 9 is relieved.

Thus, from the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. In combination with a plastic candy material press having a tubular outlet therefrom, a cutting wire adapted to pass adjacent the outlet to cut the product issuing therefrom, the wire being secured to arms mounted on a shaft having a gear or chain drive, and means whereby the backlash of the driving gears or chain is prevented from coming into play when the pressure on the cutting wire is released.

2. In combination with a plastic candy material press having a tubular outlet therefrom, a cutting wire adapted to pass adjacent the outlet to cut the product issuing therefrom, the wire being secured to arms mounted on a shaft having a gear or chain drive, and means whereby the backlash of the driving gears or chain is prevented from coming into play when the pressure on the cutting wire is released, such means including a drum on the shaft, and a brake band passing around the shaft and held thereagainst by spring tension on the outer ends of the band.

3. In combination with a plastic candy material press, a tubular outlet therefrom, such outlet having an outward slant from top to bottom, a pair of arms parallel to the outlet and mounted turnable with a shaft whose center is below that of the outlet, and a cutting wire secured to and between the arms and adapted to pass immediately adjacent the upper edge of the outlet, the wire having such tension that it will be bent away from the outlet by the pressure of the material issuing therefrom, but will snap back to a straight line upon the removal of the pressure by the rotation of the arms past the lower edge of the outlet.

In testimony whereof I affix my signature.

GEORGE K. BAINBRIDGE.

Copies of this patent may be obtained for five cents each, by addressing the "Commissioner of Patents, Washington, D. C."